(12) United States Patent
Wills (10) Patent No.: US 6,304,260 B1
(45) Date of Patent: *Oct. 16, 2001

(54) METHOD AND APPARATUS FOR GENERATING AND DISPLAYING VIEWS OF HIERARCHICALLY CLUSTERED DATA

(75) Inventor: Graham John Wills, Naperville, IL (US)

(73) Assignee: Lucent Technologies, Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/103,921

(22) Filed: Jun. 24, 1998

(51) Int. Cl.$^7$ ........................................ G06F 3/00
(52) U.S. Cl. ............................. 345/356; 345/357
(58) Field of Search ................... 345/356, 357, 345/326, 339, 967, 968

(56) References Cited

U.S. PATENT DOCUMENTS

| | | | |
|---|---|---|---|
| 5,581,797 | * 12/1996 | Baker et al. | 345/326 |
| 5,821,945 | * 10/1998 | Yeo et al. | 345/440 |
| 6,057,843 | * 5/2000 | Van Overveld et al. | 345/357 |

FOREIGN PATENT DOCUMENTS

| WO 98 46998 A | 10/1998 | (WO) | G01N/33/53 |
|---|---|---|---|

OTHER PUBLICATIONS

Jin et al ("Tennis Viewer: a browser for competition trees", IEEE Computer Graphics and Applications, v17/4, Jul.–Aug. 1997, pp. 63–65).*

Turo et al ("Hierarchial Visualization with treemaps: Making sense of pro basketball data", Proceedings of the CHI '94 conference companion on Human factors in computing systems, 1994, p 441).*

(List continued on next page.)

*Primary Examiner*—Raymond J. Bayerl
*Assistant Examiner*—Sy D. Luu (57) ABSTRACT

A technique for generating and displaying views of hierarchically clustered data in a computer system. A binary tree is stored in memory of a computer system. The leaf nodes represent data items and the interior nodes represent clusters of the data items and a measure of dissimilarity between child clusters. The nodes of the tree are traversed and a display area is recursively split until nodes having a certain level of dissimilarity are reached, at which time a group rectangle is drawn around the current rectangle. Lower level nodes continue to be processed so that all data items are displayed in the display area. During the splitting of rectangles, the rectangles are split along the longest axis to produce better dimensioned rectangles. Upon generating a new display at a different level of dissimilarity, all data items are displayed in their same relative location, with only the resulting groups changing.

8 Claims, 7 Drawing Sheets

OTHER PUBLICATIONS

Johnson et al ("Tree–maps: a space–filling approach to the visualization of hierarchical information structures", Visualization, 1991, Proceedings IEEE Conference, pp. 284–291).*

Shneiderman ("Tree visualization with tree–maps: 2–d space–filling approach", ACM Trans. Graph. 11, 1, Jan. 1992, pp. 92–99).*

Shneiderman ("Beyond intelligent machines: just do it", IEEE Software vol. 10 1, Jan. 1993, pp. 100–103).*

Asahi et al. ("Visual decision–making: Using treemaps for the Analytic Hierarchy Process", ACM Conference companion on Human factors in computing systems 1995, pp. 405–406.*

B. Johnson et al., "Tree–Maps: A Space–Filling Approach To The Visualization of Hierarchical Information Structures", *Proceedings of the Annual Conference On Visualization*, Los Alamitos, vol. Conf. 2, pp. 284–291.

R.D. Clark, "Optisim: An Extended Dissimilarity Selection Method For Finding Diverse Representative Subsets", Journal of Chemical Information and Computer Sciences, vol. 37, 1997, pp. 1181–1188.

David Turo, Brian Johnson, Improving the Visualization of Hierarchies with Treemaps: Design Issues and Experimentation, 0–8186–2897–9/92, IEEE, 1992.

Stephen G. Eick, Graham J. Wills, High Interaction Graphics, European Journal of Operational Research 81 (1995) 445–459.

* cited by examiner

| HORSE | COW |
|-------|-----|
| D | B |

| NODE | CLUSTER_DRAWN | DISPLAY AREA |
|---|---|---|
| INITIALIZATION | F | 508 |
| F | F | 510, 512, 511, 554 |
| E | F | 516, 518, 540, 514 |
| D | F → T | 524, 528, 522, 520 |
| SNAKE | T | 526, S |

FIG. 5B

| NODE | CLUSTER_DRAWN | DISPLAY AREA |
|---|---|---|
| C | T | |
| CAT | T | |
| DOG | T | |
| B | F → T | |
| MAN | T | |
| KANGAROO | T | |

FIG. 5C

| NODE | CLUSTER_DRAWN | DISPLAY AREA |
|---|---|---|
| A | F → T | |
| HORSE | T | |
| COW | T | |

METHOD AND APPARATUS FOR GENERATING AND DISPLAYING VIEWS OF HIERARCHICALLY CLUSTERED DATA

FIELD OF THE INVENTION

The present invention relates generally to data visualization. More particularly, the present invention relates to using a computer to generate and display views of hierarchically clustered data.

BACKGROUND OF THE INVENTION

A common problem in computerized data analysis is forming groups, or clusters, of similar items based on a number of variables describing the items. For example, in a business environment it is often important to form customer groups for precision marketing. The overall goal of clustering is to divide the data into a number of classes, using the variables that describe the data, such that each class contains members that are similar to each other and dissimilar to members of other classes. There are many known techniques for performing clustering. One of the most common techniques is called hierarchical clustering.

Hierarchical clustering does not require, as some other prior art techniques do, that the number of resulting clusters be pre-defined. Instead, the hierarchical clustering technique builds a binary tree in which the original data items are the leaves, and interior nodes represent clusters of items. Each interior node also stores a representation of a measure of the dissimilarity between the two sets of child clusters of the node. Once the binary tree is created, a user analyzing the data can cut the tree at a given level of dissimilarity to create clusterings with different numbers of groups without the need to re-run the clustering algorithm. This ability to cut the tree without the need to re-run the clustering algorithm is very important in the study of large data sets because it allows a user to run a potentially very slow algorithm on a large data set one time, and then examine the resulting structure in various ways without the need to re-run the algorithm and recreate the tree structure. Methods for performing hierarchical clustering are well known in the art and will therefore not be described in detail herein. Such methods are described in, *Cluster Analysis*, Everitt, B. S., 3d ed., Halsted Press, N.Y. (1993), which is incorporated by reference herein. The particular method used to perform the hierarchical clustering is not critical to the present invention.

Once the tree structure has been created using an appropriate hierarchical clustering method, the tree must be visualized, i.e., a representation of the tree must be generated and displayed on the computer screen for a user. One technique for visualizing the results of a hierarchical clustering algorithm is to simply generate and display a view of the tree structure. However, this technique becomes too cumbersome with even moderate sized data sets.

A better technique is to generate and display a tree-map, which is a technique for visualizing a tree that makes maximal use of screen space. The basic version takes a specified rectangular area and recursively subdivides it up based on the tree structure. The method looks at the first level of the tree and splits up the viewing area horizontally into n rectangles, where n is the number of children of the first node. Each rectangle is allocated an area proportional to the size of the subtree beneath each child node. The method then looks at the next level of the tree and for each node performs the same algorithm, except it recursively divides the area vertically. The algorithm continues doing this subdivision in alternating directions until either the maximum specified depth is reached or a leaf node is reached. In either case, the rectangular area for that node is then drawn with user-specified characteristics such as color, shading and labeling. The algorithm for generating a tree map is well known in the art and is described in, *Tree Visualization with Tree Maps; a 2D Space-Filling Approach*, Schniederman, ACM Transactions on Graphics, January 1992, which is incorporated herein by reference.

SUMMARY OF THE INVENTION

The present invention is an improved technique for generating and displaying views of hierarchically clustered data. Specifically, we have recognized that an improvement in generating tree maps can be realized by generating display groupings based on a measure of dissimilarity of data clusters rather than the prior art technique of cutting a tree at a given level without regard to dissimilarity.

In accordance with one embodiment of the invention, the nodes of a tree which are stored in the memory of a computer system are traversed and a display area is recursively split until nodes having a prescribed measure of dissimilarity are reached. This recursive splitting to a prescribed measure of dissimilarity produces a tree map which is a better visualization of the data clusters because the resulting groupings are more closely related to the similarity of the clusters. Advantageously, such a visualization conveys more useful information to a user analyzing the underlying data.

In accordance with another aspect of the invention, we have recognized that it is beneficial to symbolically display all data items in the tree, rather than to only display representations of accumulated groups of data items as taught by the prior art. This technique provides more useful information to a user analyzing the underlying data.

In accordance with another aspect of the invention, the tree map is recursively split along the longest axis of rectangles, rather than alternating between vertical and horizontal splits as previously done according to the prior art. Splitting along the longest axis of rectangles results in a tree map having rectangles which are more square, as opposed to the prior art technique which tends to result in long skinny triangles. Advantageously, the more square rectangles resulting from employing the invention make it easier for a user to visualize the underlying data.

In accordance with yet another aspect of the invention, when the level of dissimilarity is changed and a new tree map is generated, the data items remain in the same relative positions in the tree map. All that is changed is the display of groupings around the data items. This aspect of the invention provides for better comparisons of groups at different levels of dissimilarity.

DETAILED DESCRIPTION

Figure 1:
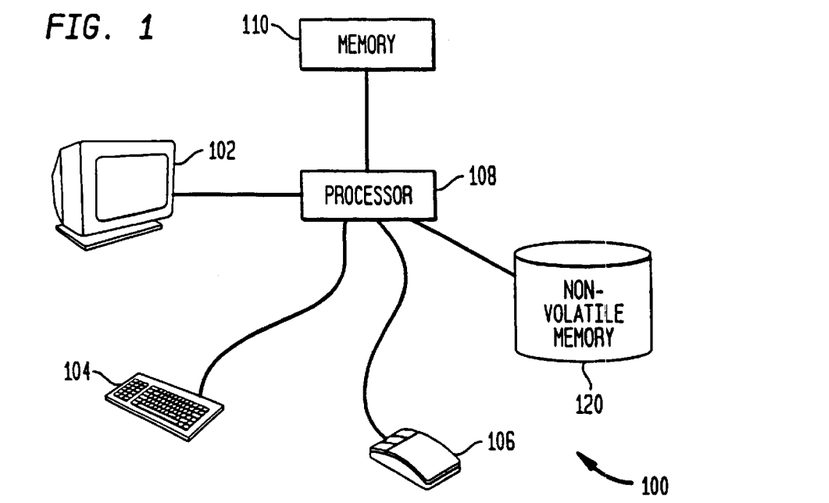
FIG. 1 shows a schematic of the components of a computer system which can be configured to implement the present invention.

The present invention may be implemented on any type of well known computer system. As used herein, the term computer includes any device or machine capable of accepting data, applying prescribed processes to the data, and supplying the results of the processes. The functions of the present invention are advantageously performed by a programmed digital computer of the type which is well known in the art, an example of which is shown in FIG. 1. FIG. 1 shows a computer system 100 which comprises a display monitor 102, a textual input device such as a keyboard 104, a graphical input device such as mouse 106, a computer processor, i.e., CPU, 108, a memory unit 110, and a non-volatile storage device such as a disk drive 120. The memory unit 110 stores, for example, computer program code and data The computer processor 108 is connected to the display monitor 102, the memory unit 110, the non-volatile storage device 120, the keyboard 104, and the mouse 106. The external storage device 120 may be used for the storage of data and computer program code. The computer processor 108 executes the computer program code which is stored in memory unit 110. During execution, the processor may access data stored in memory unit 110 and in the non-volatile storage device 120. The computer system 100 may suitably be any one of the types which are well known in the art such as a mainframe computer, a minicomputer, a workstation, or a personal computer. Of course, one skilled in the art will appreciate that there are many other components which may be included in a computer system but which are not shown in FIG. 1 for clarity. In addition, one skilled in the would recognize that many modifications and component substitutions could be made to the computer system in FIG. 1.

Table 1 shown below contains sample data which will be used to describe the present invention. The table consists of data on seven animals including their relative sizes and number of legs.

TABLE 1

| Animal | Legs | Size |
|---|---|---|
| cat | 4 | 2 |
| cow | 4 | 13 |
| dog | 4 | 5 |
| horse | 4 | 12 |
| kangaroo | 2 | 7 |
| man | 2 | 9 |
| snake | 0 | 3 |

Figures 2, 3:
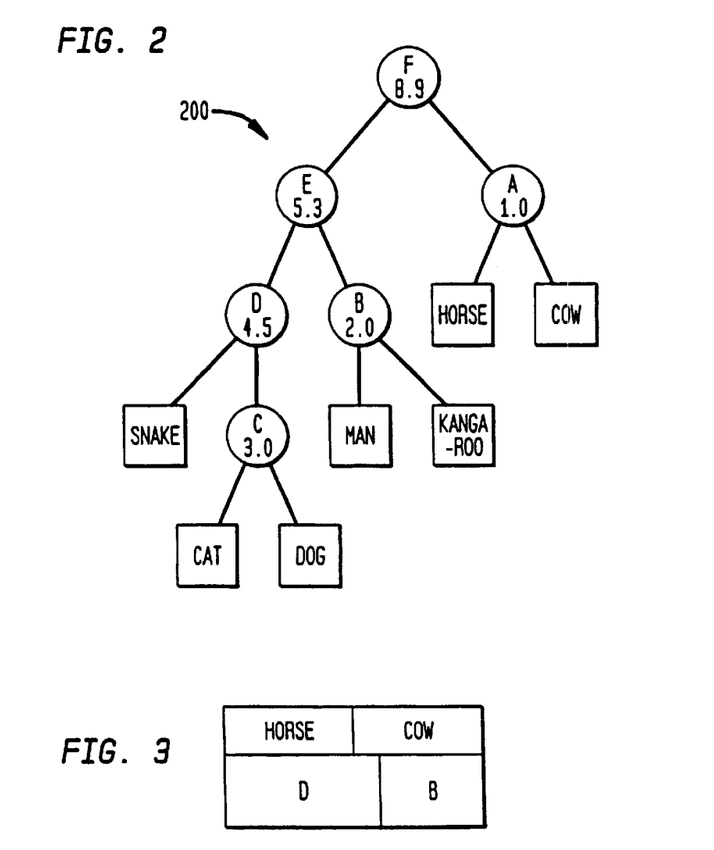
FIG. 2 shows a tree resulting from the application of a hierarchical clustering method.
FIG. 3 show an example tree map.

FIG. 2 shows a tree 200 resulting from the application of a hierarchical clustering method to the data in table 1. As described above, any of the well known hierarchical clustering methods may be used to create a tree similar to the tree shown in FIG. 2. While different hierarchical clustering methods may produce slightly different trees, the basic structure of the trees would be the same. The interior nodes A, B, C, D, E, F, are cluster nodes representing clusters of data items. For example, cluster node C represents the cluster of the data items cat and dog. Cluster node D represents the cluster of the data item snake and the cluster node C. The interior nodes are annotated with the dissimilarity between their child nodes. For example, node D has dissimilarity 4.5, while node B has dissimilarity 2.0. This means that man is more similar to kangaroo than snake is to the cat-dog pair. The tree structure shown in FIG. 2 is stored in memory 110 of the computer system 100 using well known data representation techniques.

Given the tree shown in FIG. 2, the present invention provides an improved technique for visualizing the clustering. We have recognized that there are certain problems with the existing tree-map technique for visualizing a hierarchical clustering. One problem with the existing tree-map technique is that there is no use of the dissimilarity of the clusters. A user can only create display groups based on cutting the tree at different depths. For example, consider the tree shown in FIG. 2. Using the prior art technique, a user could cut the tree at depth 2, i.e. nodes E and A, giving the groups:

D: cat-dog-snake (the left child node of E);

B: kangaroo-man (the right child node of E);

horse (the left child node of A); and cow (the right child node of A).

The tree-map that would result from this grouping is shown in FIG. 3, where the groups horse, cow, D, and B, are shown. However, note that this grouping splits up cow and horse, which is undesirable because they are very similar to each other, i.e., they have a dissimilarity of 1.0. However, because the existing tree-map technique does not have the ability to create groups based on dissimilarity, a grouping based on tree depth is the best it can do.

Another problem with the existing tree-maps is that tree-maps show accumulated groups of data items only. For example, in FIG. 3, the groups D and B are shown in the tree-map, but not the individual data items that make up the groups D and B. We have recognized that it is beneficial to show the individual data items rather than the accumulated groups.

Another problem with the existing tree-maps is that the alternating horizontal and vertical splits is good at showing the tree depth, but has a tendency to create very long skinny rectangles when the underlying tree is unbalance. This can be seen in FIG. 3. In accordance with one aspect of the present invention, instead of alternating between vertical and horizontal splits, the display area is split along the longest axis of a rectangle, such that the resulting rectangles are more square than they would have been if cut along the other axis.

One method for implementing the present invention in order to realize these improvements to existing tree-maps is described below in conjunction with FIGS. 4–6. The improved method will be described as follows. First, the steps of a flowchart (FIG. 4) will be generally described without reference to any particular example. The purpose of this discussion is to give a general context to the method and to generally discuss the steps performed in an abstract manner. After this discussion, the steps of the flowchart will be described in further detail in conjunction with the processing of the example tree of FIG. 2. This discussion will give a detailed example of the method of the present invention.

Figure 4:
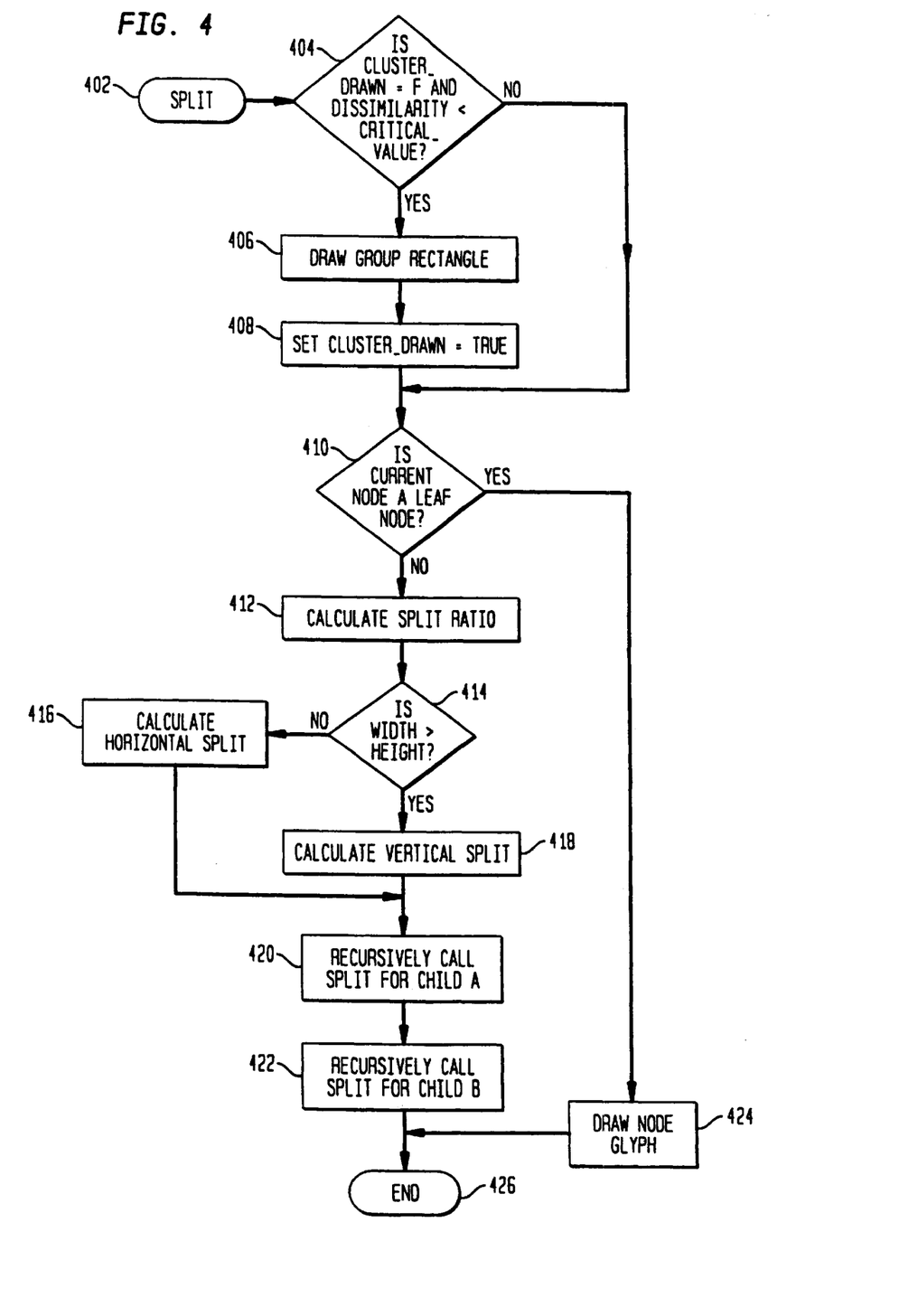
FIG. 4 is a flow chart showing the steps performed in accordance with the invention.

A flow chart showing the steps to be performed by the programmed computer is shown in FIG. 4. As is well known, the steps to be performed by the computer may be implemented by appropriate computer program code stored in memory 110 and executed by the processor 108. Given the following description, one skilled in the art could readily implement the invention utilizing a programmed digital computer.

Returning now to FIG. 4, in step 402 the routine to split a given display area is called. The split routine is passed several variables when it is called. First, a node n is passed, which is the node being processed. When initially being called, the node n is the highest level root node of the tree. The coordinates of a rectangle are also passed, with this rectangle initially defining a display area of the display device 102 in which the visualization of the tree map will be displayed. A Boolean variable cluster_drawn is also passed, with this variable being initialized to False prior to the first call of the split routine. Finally, a variable critical_value is passed. This variable indicates the level of dissimilarity at which the method will display groupings.

In step 404 it is determined whether cluster_drawn is False and if the dissimilarity of the node n is less than the critical value. If the test of step 404 is No, then control passes to step 410. If the test of step 404 is Yes, then in step 406 a group rectangle is drawn around the currently defined rectangle. In step 408 cluster_drawn is set to true.

In step 410 it is determined whether the current node is a leaf node. If it is, then control is passed to step 424 where a glyph, i.e. symbol, for the node, i.e. data item, is drawn in the current rectangle, and control is passed to step 426. If it is determined in step 410 that the current node is not a leaf node, then in step 412 a split ratio is calculated. This step calculates where the rectangle will be split so that each of the resulting rectangles is allocated an area proportional to the size of the subtree underneath each child of the current node.

In step 414 it is determined whether the width of the current rectangle is greater than the height of the current rectangle. If it is, then the split is calculated to be a vertical split in step 418. If the width is not greater than the height, then the split is calculated to be a horizontal split in step 416. These steps 414, 416, 418 implement the aspect of the invention described above in which the display area is split along the longest axis of a rectangle. This results in rectangles which are more square than they would have been if cut along alternating vertical and horizontal axes as in the prior art.

In step 420 the split routing is called recursively for the child node A, i.e., the left child, of the current node. In step 422, the split routing is called recursively for the child node B, i.e., the right child, of the current node. The split routine ends in step 426. It is noted that a recursive subroutine call is one in which a subroutine calls itself. Recursion is a well known technique in computer science.

The method steps of FIG. 4 will now be described in further detail in conjunction with FIGS. 5A–5C and 6 and the example tree of FIG. 2. FIGS. 5A–5C illustrate the ongoing processing of the tree and illustrates the recursive splitting of a display area rectangle. FIG. 6 illustrates the levels of recursion during processing.

Returning now to FIG. 4 and the tree of FIG. 2, assume that a user wants to process the tree of FIG. 2 and is interested in grouping the data at a dissimilarity level of 5. The split routing would be called in step 402 passing the following parameters: an identification of node F, the coordinates of an initial rectangle, the cluster_drawn variable initialized to False, and a critical_value=5 which indicates the desired dissimilarity grouping level. FIG. 6 illustrates the level of recursion during processing. When the split routine is first called with node F, the processing is at recursion level identified by block 602.

Figure 5A:
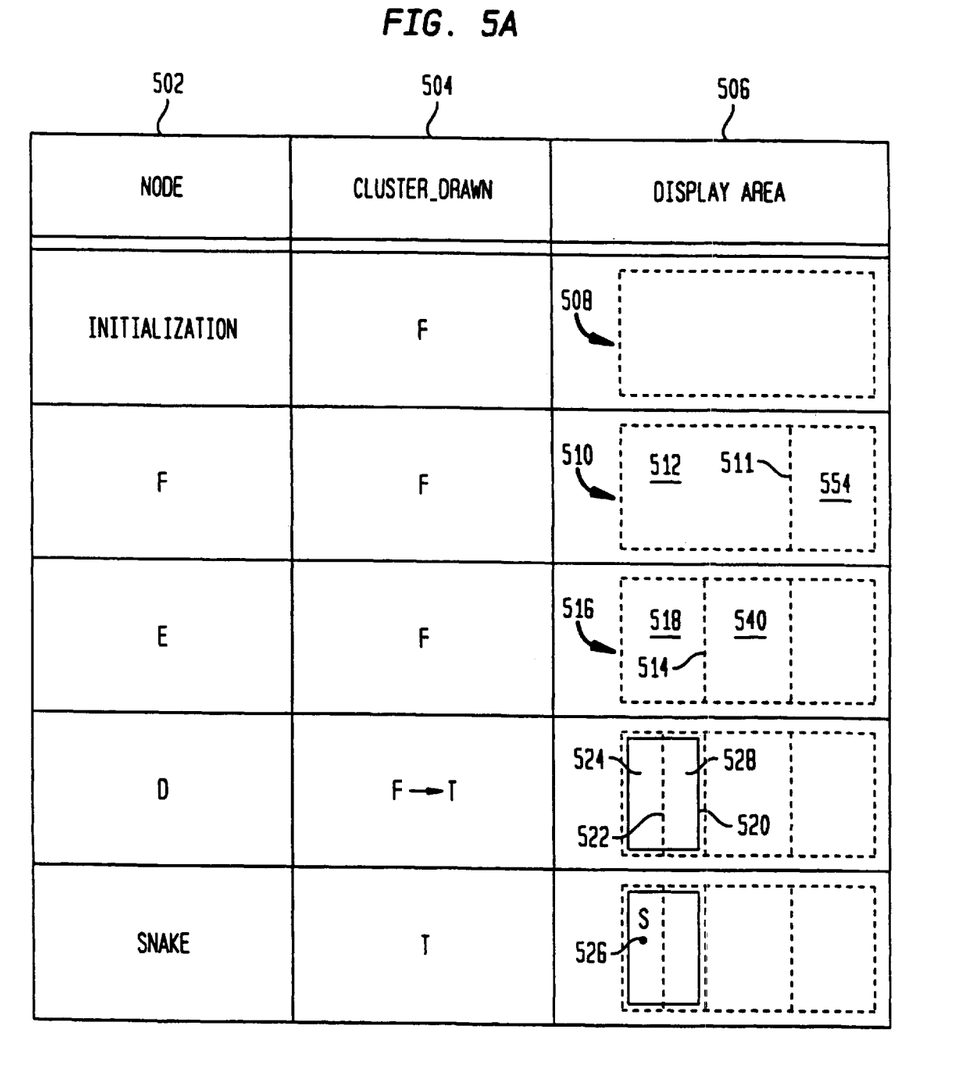
FIGS. 5A–5C illustrate the ongoing processing and resulting tree maps at each stage of processing in accordance with the processing of an example tree.
Figure 5B:
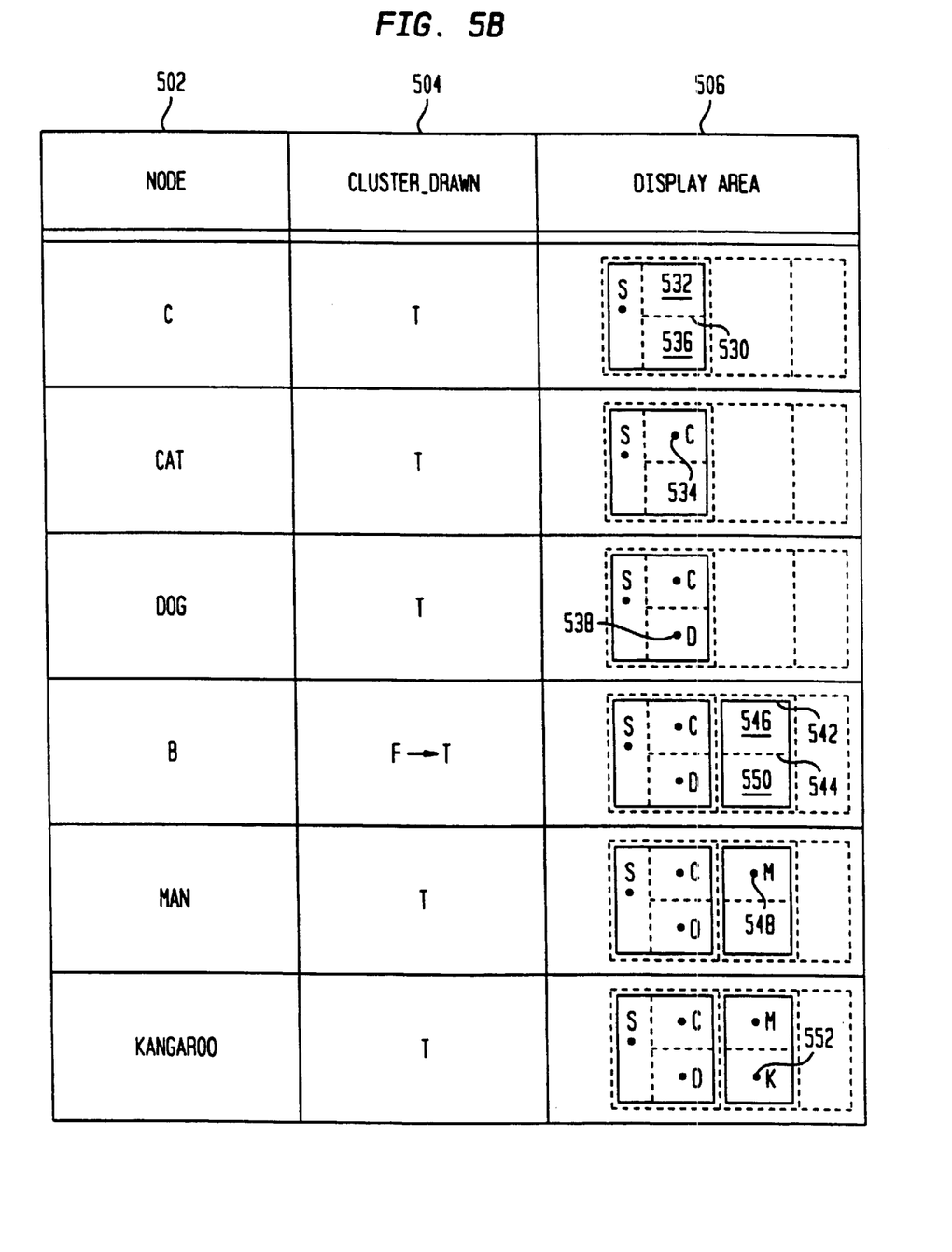
Figure 5C:
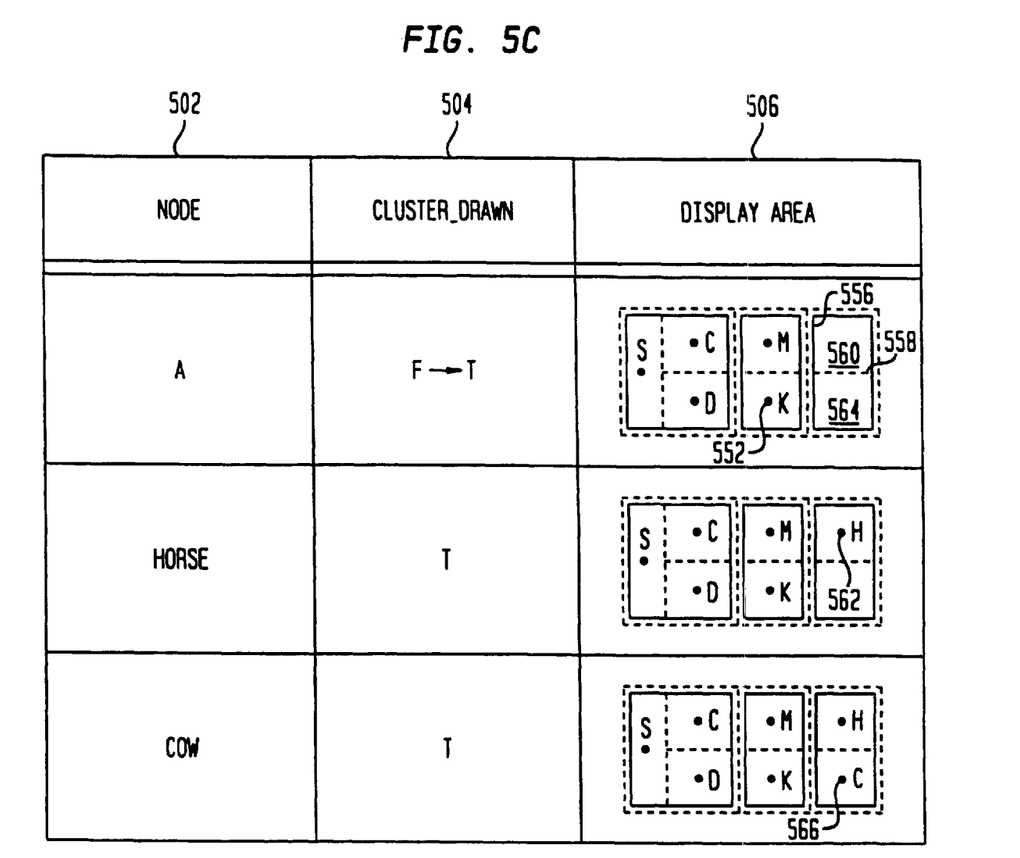

FIGS. 5A–5C (collectively hereinafter referred to as FIG. 5) show the value of the cluster_drawn variable (column 504), along with an incremental illustration of the splitting of the display area (column 506) for each recursive call of the split routine. The node currently being processed is shown in column 502. Returning now to step 404 of FIG. 4, it is determined whether cluster_drawn=False and dissimilarity<critical_value. The test returns No because although cluster_drawn=False, the dissimilarity of node F is 8.9 which is not less than the critical_value which is 5.

Control passes to step 410 in which is determined that the current node, F, is not a leaf node and in step 412 a split ratio is calculated. The split ratio is calculated as the ratio of the number of data items, i.e. leaves, of the child node A, to the number of data items of the child node B. Thus, in the example, when processing node F, the ratio would be 5:2. In step 414 it is determined whether the width of the current rectangle is greater than its height. As shown in column 506 of FIG. 5, the initial rectangle 508 is wider than it is high, so the test in step 414 is Yes and control passes to step 418 where the rectangle split is calculated to be a vertical split. Thus, the initial rectangle is calculated to be split vertically in the ratio of 5:2. Such a rectangle 510 is shown with split line 511 in FIG. 5, column 506 in the row indicating the processing of node F. It is noted that the rectangle is shown using dotted lines to represent that these rectangle splits are calculations only. The actual drawing of a grouping rectangle is not performed until the desired level of dissimilarity is reached. The actual drawing of a group rectangle is performed in step 406, which is only performed when the test in step 404 is true.

Returning to the processing steps, control is passes to step 420 where the split routine is recursively called for the child A of the node currently being processed. The node currently being processed is node F, and thus the split routine is recursively called for node E. As described above, when the split routine is called it must be passed certain parameters. These parameters are also passed when it is called recursively. Thus, the split routine is now called by passing: node E, which is the node being processed; the coordinates of the left side 512 of the rectangle as split during the processing of node F, as this is the rectangle corresponding to child A of node F, i.e. node E, which is the node currently being processed; the Boolean variable cluster_drawn still having the value False; and critical_value=5.

Figure 6:
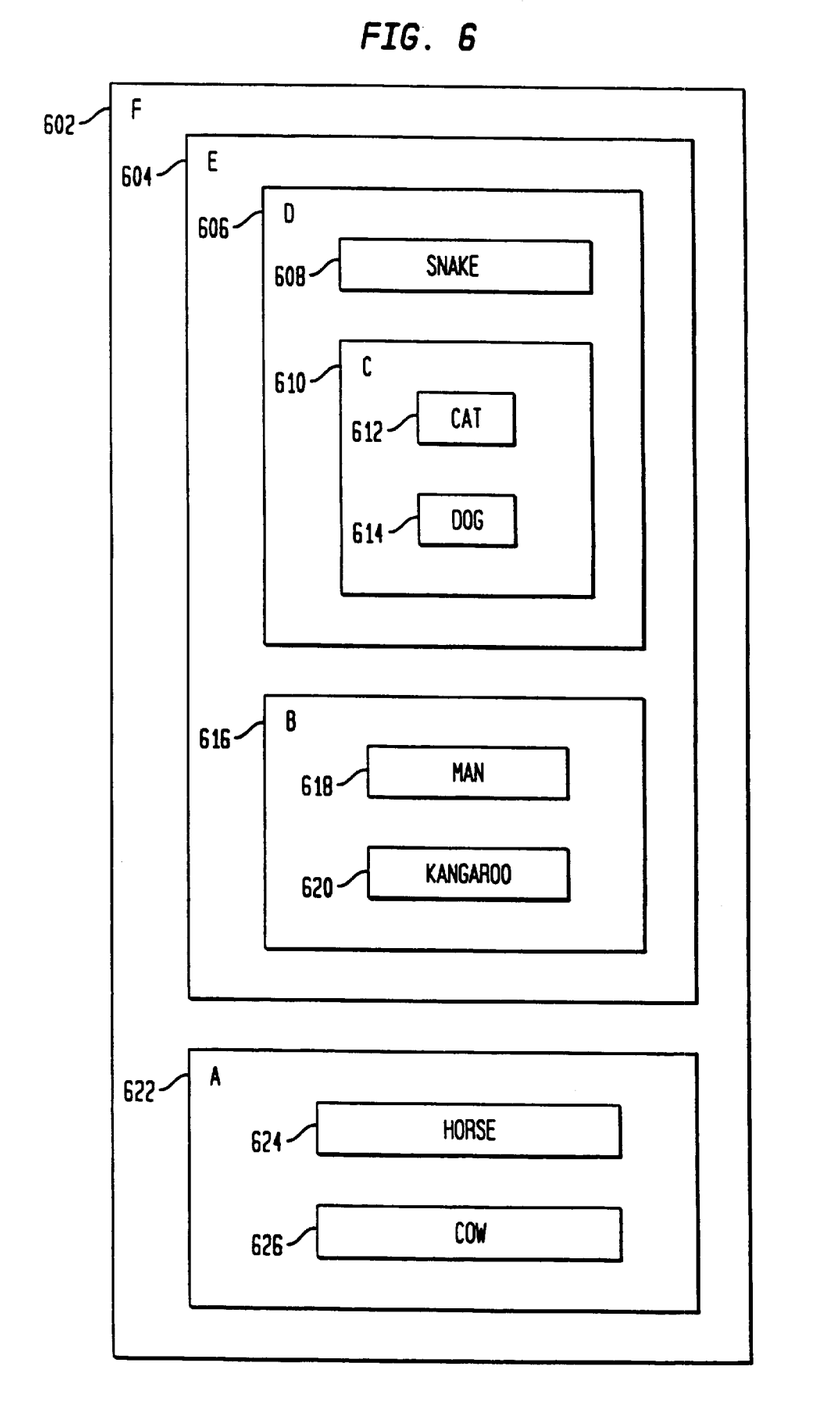
FIG. 6 illustrates the levels of recursion during the processing of an example tree.

The level of recursion during the processing of node E, is shown as level 604 in FIG. 6. The test in step 404 is still false because although cluster_drawn=False, the dissimilarity of node E is 5.3 which is not less than the critical_value which is 5. Control passes to step 410 in which it is determined that node E is not a leaf node and a split ratio of 3:2 is calculated in step 412 as described above. Since the rectangle 512 being processed is wider than it is high, a vertical split in the ratio of 3:2 is calculated in step 418. This calculated split is represented as split line 514 in rectangle 516 in FIG. 5 for the processing of node E.

Returning to the processing steps, control is passes to step 420 where the split routine is recursively called for the child A of the node currently being processed. The node currently being processed is node E, and thus the split routine is recursively called for node D. The split routine is now called by passing the following parameters: node D, which is the node being processed; the coordinates of rectangle 518 as split during the processing of node E, as this is the rectangle corresponding to child A of node E, i.e. node D, which is the node currently being processed; the Boolean variable cluster_drawn still having the value False; and critical_value=5.

The level of recursion during the processing of node D, is shown as level 606 in FIG. 6. Returning now to the processing steps of FIG. 4, the test in step 404 is now true because cluster_drawn=False and the dissimilarity of node D is 4.5 which is less than the critical_value which is 5. Control passes to step 406 in which a group rectangle is drawn around the current rectangle. Thus, a group rectangle is drawn around rectangle 518, as illustrated by the solid line rectangle 520 shown in FIG. 5 with respect to the processing of node D. This solid line rectangle 520 represents the actual drawing of a rectangle in the display area as distinguished from the dotted lines which only represent the calculations of the rectangle splits. It is noted that various methods for drawing a group rectangle may be used. The example of FIG. 5 shows the drawing of a boundary to designate a group rectangle. As an example of an alternate technique, a group may be designated by filling the interior of a rectangle with a color/texture pattern that might carry additional information about the group.

Processing continues with step 408 with the variable cluster_drawn being set to true. This variable value change is also represented in column 504 of FIG. 5 in connection with the processing of node D as F→T.

Processing continues with step 410. Since the current node is not a leaf node, the current rectangle is split again as discussed above in connection with steps 414–418. This further splitting of the current rectangle is shown in FIG. 5 by dotted line 522 vertically splitting the rectangle 518.

In step 420 the split routine is recursively called for the child A of node D. The node currently being processed is node D, and thus the split routine is recursively called for leaf node snake. The split routine is now called by passing the following parameters: node snake, which is the node being processed; the coordinates of rectangle 524 as split during the processing of node D, as this is the rectangle corresponding to child A of node D, i.e. node snake, which is the node currently being processed; the Boolean variable cluster_drawn now having the value True; and critical_value=5.

The level of recursion during the processing of node snake, is shown as level 608 in FIG. 6. Returning now to the processing steps of FIG. 4, the test in step 404 is now false because although the dissimilarity of node snake is 0, which is less than the critical_value of 5, cluster_drawn=True. It is noted that the dissimilarity of node snake is 0 because by definition any item has zero dissimilarity with itself. Control passes to step 410. Since the current node is a leaf node, control passes to step 424 in which a glyph for the node snake is drawn in the current rectangle as shown as glyph 526 in FIG. 5 in connection with the processing of node snake. It is noted that any method for drawing a glyph may be used. For example, a glyph may be drawn as a textual name, a symbol, or a color-coded circle or other shape. It is also possible to draw a glyph differently depending on which group it is contained in. Returning now to the example, control now passes to step 426 and, as illustrated in FIG. 6, recursion level 608 ends and processing returns to recursion level 606. Returning to recursion level 606 returns control to step 422 where the split routine is recursively called for child node B of node D.

The split routine is recursively called for node C by passing the following parameters: node C, which is the node being processed; the coordinates of rectangle 528 as split during the processing of node D, as this is the rectangle corresponding to child B of node D, i.e. node C, which is the node currently being processed; the Boolean variable cluster_drawn still having the value True because it is being passed from recursion level 606 which is the level which processed node D and changed the value from F→T; and critical_value=5. The level of recursion during the process-ing of node C, is shown as level 610 in FIG. 6. Returning now to the processing steps of FIG. 4, the test in step 404 is now False because although the dissimilarity of node C is 3.0, which is less than the critical_value of 5, cluster_drawn=True.

Processing continues with step 410. Since the current node is not a leaf node, the current rectangle is split again as discussed above in connection with steps 414–418. This further splitting of the current rectangle is shown by dotted line 530 horizontally splitting the rectangle in FIG. 5.

In step 420 the split routine is recursively called for the child A of node C, and thus the split routine is recursively called for leaf node cat. The split routine is now called by passing the following parameters: node cat, which is the node being processed; the coordinates of rectangle 532 as split during the processing of node C, as this is the rectangle corresponding to child A of node C, i.e. node cat, which is the node currently being processed; the Boolean variable cluster_drawn now having the value True; and critical_value=5.

The level of recursion during the processing of node cat, is shown as level 612 in FIG. 6. Returning now to the processing steps of FIG. 4, the test in step 404 is now false because although the dissimilarity of node cat is 0, which is less than the critical_value of 5, cluster_drawn=True. Control passes to step 410. Since the current node is a leaf node, control passes to step 424 in which a glyph for the node cat is drawn in the current rectangle 532 as shown as glyph 534 in FIG. 5 in connection with the processing of node cat. Control now passes to step 426 and, as illustrated in FIG. 6, recursion level 612 ends and processing returns to recursion level 610. Returning to recursion level 610 returns control to step 422 where the split routine is recursively called for child node B of node C, i.e. node dog. Thus, processing now enters recursion level 614.

The split routine is now called by passing the following parameters: node dog, which is the node being processed; the coordinates of rectangle 536 as split during the processing of node C, as this is the rectangle corresponding to child B of node C, i.e. node dog, which is the node currently being processed; the Boolean variable cluster_drawn having the value True; and critical_value=5.

The level of recursion during the processing of node dog, is shown as level 614 in FIG. 6. Returning now to the processing steps of FIG. 4, the test in step 404 is false because although the dissimilarity of node dog is 0, which is less than the critical_value of 5, cluster_drawn=True. Control passes to step 410. Since the current node is a leaf node, control passes to step 424 in which a glyph for the node dog is drawn in the current rectangle 536 as shown as glyph 538 in FIG. 5 in connection with the processing of node dog. Control now passes to step 426 and, as illustrated in FIG. 6, recursion level 614 ends and processing returns to recursion level 610. Returning to recursion level 610 returns control to step 426 such that processing returns to recursion level 606. Returning to recursion level 606 returns control to step 426 such that processing returns to recursion level 604. Returning to recursion level 604 passes control to step 422 for the processing of child node B of node E, i.e. node B.

The split routine is recursively called for node B. The split routine is now called by passing the following parameters: node B, which is the node being processed; the coordinates of rectangle 540 as split during the processing of node E, as this is the rectangle corresponding to child B of node E, i.e. node B, which is the node currently being processed; the Boolean variable cluster_drawn now having the value False because it is being passed from recursion level 604 which is the level which processed node E where the value of cluster_drawn is still False (see FIG. 5 column 504 in connection with the processing of node E); and critical_value=5.

The level of recursion during the processing of node B, is shown as level 616 in FIG. 6. Returning now to the processing steps of FIG. 4, the test in step 404 is now true because the dissimilarity of node B is 2.0, which is less than the critical value of 5, and cluster_drawn=False. Control passes to step 406 in which a group rectangle 542 is drawn around the current rectangle 540. This solid line rectangle 542 represents the actual drawing of a rectangle in the display area as distinguished from the dotted lines which only represent the calculations of the rectangle splits.

Processing continues with step 408 with the variable cluster_drawn being set to true. This variable value change is also represented in column 504 of FIG. 5 in connection with the processing of node B as F→T.

Processing continues with step 410. Since the current node is not a leaf node, the current rectangle is split again as discussed above in connection with steps 414–418. This further splitting of the current rectangle is shown in FIG. 5 by dotted line 544 horizontally splitting the rectangle.

In step 420 the split routine is recursively called for the child A of node B, and thus the split routine is recursively called for leaf node man. The split routine is now called by passing the following parameters: node man, which is the node being processed; the coordinates of rectangle 546 as split during the processing of node B, as this is the rectangle corresponding to child A of node B, i.e. node man, which is the node currently being processed; the Boolean variable cluster_drawn now having the value True; and critical_value=5.

The level of recursion during the processing of node man, is shown as level 618 in FIG. 6. Returning now to the processing steps of FIG. 4, the test in step 404 is now false because although the dissimilarity of node man is 0, which is less than the critical_value of 5, cluster_drawn=True. Control passes to step 410. Since the current node is a leaf node, control passes to step 424 in which a glyph for the node man is drawn in the current rectangle 546 as shown as glyph 548 in FIG. 5 in connection with the processing of node man. Control now passes to step 426 and, as illustrated in FIG. 6, recursion level 618 ends and processing returns to recursion level 616. Returning to recursion level 616 returns control to step 422 where the split routine is recursively called for child node B of node B, i.e. node kangaroo. Thus, processing now enters recursion level 620.

The split routine is now called by passing the following parameters: node kangaroo, which is the node being processed; the coordinates of rectangle 550 as split during the processing of node B, as this is the rectangle corresponding to child B of node B, i.e. node kangaroo, which is the node currently being processed; the Boolean variable cluster_drawn having the value True; and critical_value=5.

The level of recursion during the processing of node kangaroo, is shown as level 620 in FIG. 6. Returning now to the processing steps of FIG. 4, the test in step 404 is false because although the dissimilarity of node kangaroo is 0, which is less than the critical_value of 5, cluster drawn=True. Control passes to step 410. Since the current node is a leaf node, control passes to step 424 in which a glyph for the node kangaroo is drawn in the current rectangle 550 as shown as glyph 552 in FIG. 5 in connection with the processing of node kangaroo. Control now passes to step 426 and, as illustrated in FIG. 6, recursion level 620 ends and processing returns to recursion level 616. Returning to recursion level 616 returns control to step 426 such that processing returns to recursion level 604. Returning to recursion level 604 returns control to step 426 such that processing returns to recursion level 602. Returning to recursion level 602 passes control to step 422 for the processing of child node B of node F, i.e. node A.

The split routine is recursively called for node A. The split routine is now called by passing the following parameters: node A, which is the node being processed; the coordinates of rectangle 554 as split during the processing of node F; as this is the rectangle corresponding to child B of node F, i.e. node A, which is the node currently being processed; the Boolean variable cluster_drawn now having the value False because it is being passed from recursion level 602 which is the level which processed node F where the value of cluster_drawn is still False (see FIG. 5 column 504 in connection with the processing of node F); and critical_value=5.

The level of recursion during the processing of node A is shown as level 622 in FIG. 6. Returning now to the processing steps of FIG. 4, the test in step 404 is now true because the dissimilarity of node A is 1.0, which is less than the critical_value of 5, and cluster_drawn=False. Control passes to step 406 in which a group rectangle 556 is drawn around the current rectangle 554. This solid line rectangle 556 represents the actual drawing of a rectangle in the display area as distinguished from the dotted lines which only represent the calculations of the rectangle splits.

Processing continues with step 408 with the variable cluster_drawn being set to true. This variable value change is also represented in column 504 of FIG. 5 in connection with the processing of node A as F→T.

Processing continues with step 410. Since the current node is not a leaf node, the current rectangle is split again as discussed above in connection with steps 414–418. This further splitting of the current rectangle is shown by dotted line 558 horizontally splitting the rectangle in FIG. 5.

In step 420 the split routine is recursively called for the child A of node A, and thus the split routine is recursively called for leaf node horse. The split routine is now called by passing the following parameters: node horse, which is the node being processed; the coordinates of rectangle 560 as split during the processing of node A, as this is the rectangle corresponding to child A of node A, i.e. node horse, which is the node currently being processed; the Boolean variable cluster_drawn now having the value True; and critical_value=5.

The level of recursion during the processing of node horse, is shown as level 624 in FIG. 6. Returning now to the processing steps of FIG. 4, the test in step 404 is now false because although the dissimilarity of node horse is 0, which is less than the critical_value of 5, cluster_drawn=True. Control passes to step 410. Since the current node is a leaf node, control passes to step 424 in which a glyph for the node horse is drawn in the current rectangle 560 as shown as glyph 562 in FIG. 5 in connection with the processing of node horse. Control now passes to step 426 and, as illustrated in FIG. 6, recursion level 624 ends and processing returns to recursion level 622. Returning to recursion level 622 returns control to step 422 where the split routine is recursively called for child node B of node A, i.e. node cow.

The split routine is now called by passing the following parameters: node cow, which is the node being processed; the coordinates of rectangle 564 as split during the processing of node A, as this is the rectangle corresponding to child B of node A, i.e. node cow, which is the node currently being processed; the Boolean variable cluster_drawn having the value True; and critical_value=5.

The level of recursion during the processing of node cow, is shown as level 626 in FIG. 6. Returning now to the processing steps of FIG. 4, the test in step 404 is false because although the dissimilarity of node cow is 0, which is less than the critical_value of 5, cluster_drawn=True. Control passes to step 410. Since the current node is a leaf node, control passes to step 424 in which a glyph for the node cow is drawn in the current rectangle 564 as shown as glyph 566 in FIG. 5 in connection with the processing of node cow. Control now passes to step 426 and, as illustrated in FIG. 6, recursion level 626 ends and processing returns to recursion level 622. Returning to recursion level 622 returns control to step 426 such that processing returns to recursion level 602. Returning to recursion level 604 returns control to step 426 such that the recursive method ends.

Figure 7:
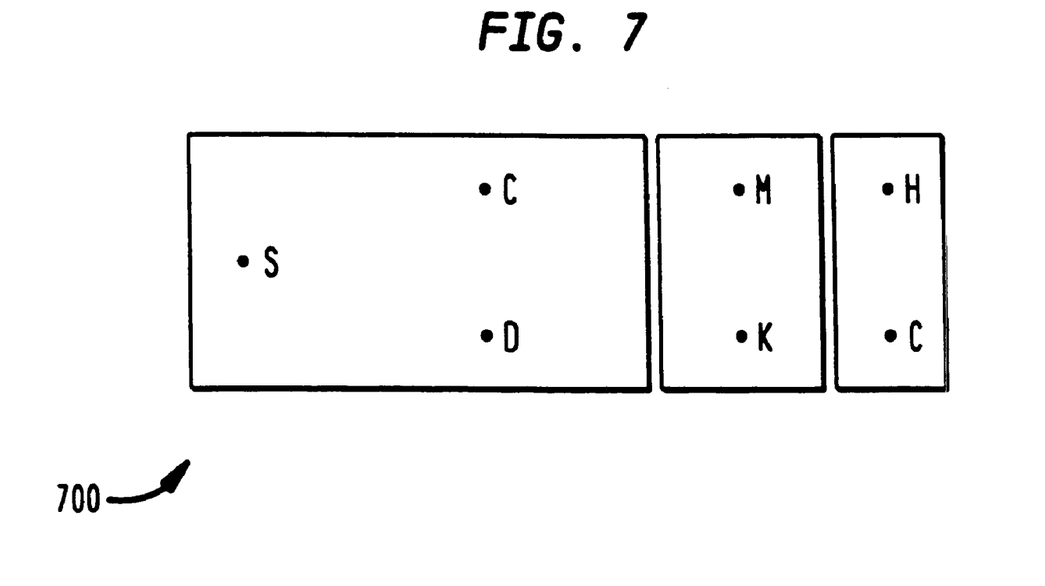
FIG. 7 shows an example display generated in accordance with the invention.

When processing is finished, the visualization of the tree of FIG. 2, with the chosen dissimilarity value of 5, is as shown in FIG. 7 as display 700. This display 700 will be displayed on the computer display screen 102 (FIG. 1).

Figure 8:
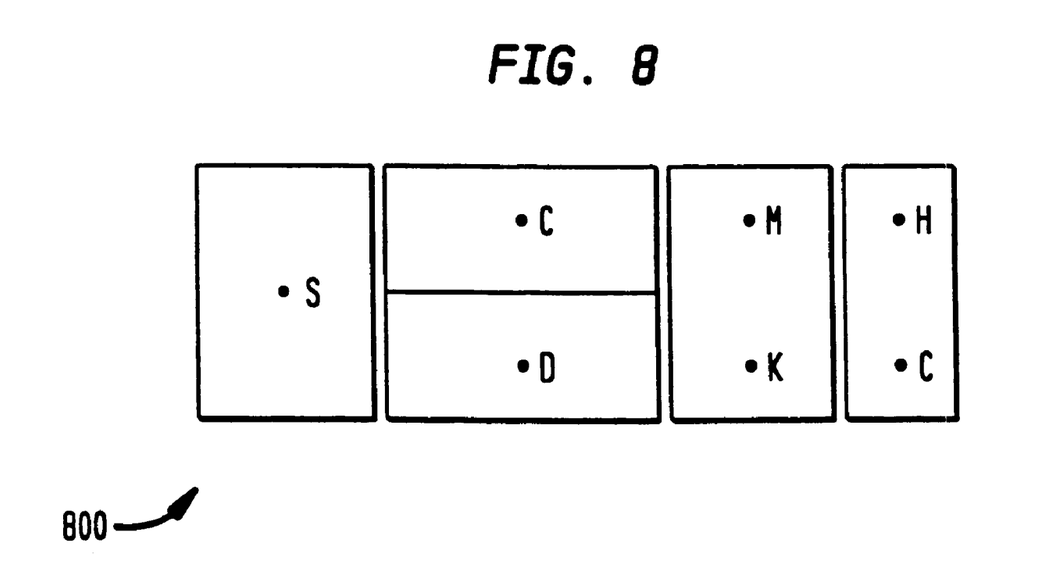
FIG. 8 shows an example display generated in accordance with the invention.

In accordance with one aspect of the invention, if the split routine is re-executed with a different critical_value, the displayed groupings will change, but the relative location of the individual data items will remain the same. For example, FIG. 7 shows the resulting display 700 when the critical_value is set to 5. FIG. 8 shows the resulting display 800 when the critical_value is set to 2.5. Note that all the individual data items are shown in the same position as in FIG. 7. Only the display groupings have changes. This aspect of the invention is beneficial to users comparing different levels of dissimilarity.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing form the scope and spirit of the invention. For example, although the present invention is explained with reference to binary trees, the invention could be readily practiced using other types of trees. In such embodiments, the split ratio calculation would not necessarily be a one-to-one split, but would be in the ratio of the number of data items, i.e., leaves, in each of the child nodes. For example, an interior node with 4 children containing 1, 2, 5 and 9 data items would be split in the ratio 1:2:5:9. Further, additional recursive calls may be necessary, as one call is needed for each child node.

I claim:

1. A method of operation of a computer system for displaying hierarchically clustered information within a display area of a display screen, the method comprising the steps of:
   accessing a tree data structure stored in a memory of said computer system, said tree data structure comprising,
   leaf nodes representing data items, and
   interior nodes representing clusters of said data items and wherein each said interior node has a measure of dissimilarity between child clusters;
   calculating display area groupings by:
   traversing the nodes of said tree data structure, and
   recursively splitting said display area until nodes having at least a first measure of dissimilarity are reached; and
   displaying said display area groupings in said display area on said display screen such that all leaf nodes are displayed.

2. The method of claim 1 further comprising the step of:
   generating a glyph in said display area for each data item in said tree data structure.

3. The method of claim 2 further comprising the steps of:
   calculating revised display area groupings by:
   traversing the nodes of said tree data structure, and
   recursively splitting said display area until nodes having at least a second measure of dissimilarity are reached; and
   displaying said revised display area groupings in said display area on said display screen;
   wherein, the positions of said glyphs in said display area remain unchanged.

4. A method of operation of a computer system for displaying hierarchically clustered information within a display area of a display screen, the method comprising the steps of:
   accessing a tree data structure stored in a memory of said computer system, said tree data structure comprising,
   leaf nodes representing data items, and
   interior nodes representing clusters of said data items and a measure of dissimilarity between child clusters;
   calculating display area groupings by:
   traversing the nodes of said tree data structure, and
   recursively splitting said display area until nodes having at least a first measure of dissimilarity are reached; and
   displaying said display area groupings in said display area on said display screen wherein said display area is split into rectangles and wherein said step of recursively splitting further comprises the step of recursively splitting said display area along the longest axis of a current rectangle.

5. A computer system for displaying hierarchically clustered information within a display area of a display screen comprising:
   a memory storing:
   a tree data structure comprising:
   leaf nodes representing data items, and
   interior nodes representing clusters of said data items and wherein each of said interior nodes has a measure of dissimilarity between sets of child clusters; and
   computer program instructions for execution on said computer system for performing the steps of:
   calculating display area groupings by:
   traversing the nodes of said tree data structure;
   recursively splitting said display area until nodes having at least a first measure of dissimilarity are reached; and
   displaying said display area groupings in said display area on said display screen such that all leaf nodes are displayed.

6. The computer system of claim 5 further comprising computer program instructions for performing the step of:
   generating a glyph in said display area for each data item in said tree data structure.

7. The computer system of claim 6 further comprising computer program instructions for performing the step of:
   calculating revised display area groupings by:
   traversing the nodes of said tree data structure, and
   recursively splitting said display area until nodes having at least a second measure of dissimilarity are reached; and
   displaying said revised display area groupings in said display area on said display screen.

8. A computer system for displaying hierarchically clustered information within a display area of a display screen comprising:

a memory storing:
   a tree data structure comprising:
   leaf nodes representing data items, and
   interior nodes representing clusters of said data items and a measure of dissimilarity between sets of child clusters; and
   computer program instructions for execution on said computer system for performing the steps of:
      calculating display area groupings by:
         traversing the nodes of said tree data structure;
         recursively splitting said display area until nodes having at least a first measure of dissimilarity are reached; and
      displaying said display area groupings in said display area on said display screen;
   wherein said display area is split into rectangles and wherein said computer program instructions for performing the step of recursively splitting further comprise computer program instructions for performing the step of recursively splitting said display area along the longest axis of a current rectangle.

* * * * *